United States Patent
Matthews et al.

(10) Patent No.: US 8,732,491 B2
(45) Date of Patent: *May 20, 2014

(54) SYSTEM AND METHOD FOR ADJUSTING AN ENERGY EFFICIENT ETHERNET CONTROL POLICY USING MEASURED POWER SAVINGS

(71) Applicants: Brad Matthews, San Jose, CA (US); Puneet Agarwal, Cupertino, CA (US); Bruce Kwan, Sunnyvale, CA (US)

(72) Inventors: Brad Matthews, San Jose, CA (US); Puneet Agarwal, Cupertino, CA (US); Bruce Kwan, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/660,041

(22) Filed: Oct. 25, 2012

(65) Prior Publication Data

US 2013/0051304 A1    Feb. 28, 2013

Related U.S. Application Data

(63) Continuation of application No. 12/603,564, filed on Oct. 21, 2009, now Pat. No. 8,347,121.

(60) Provisional application No. 61/230,132, filed on Jul. 31, 2009.

(51) Int. Cl.
*H04B 7/185* (2006.01)

(52) U.S. Cl.
USPC .......... 713/300; 713/310; 713/320; 713/321; 713/322; 713/323; 713/324; 713/330; 713/340; 455/205; 370/230.1; 370/318

(58) Field of Classification Search
USPC ................ 713/300, 310, 320–324, 330, 340; 455/205; 370/230.1, 318
See application file for complete search history.

(56) References Cited

U.S. PATENT DOCUMENTS

| | | | |
|---|---|---|---|
| 7,814,322 B2 | 10/2010 | Gurevich et al. | |
| 7,861,098 B2 | 12/2010 | Theocharous et al. | |
| 7,861,099 B2 | 12/2010 | Theocharous et al. | |
| 7,957,335 B2 | 6/2011 | Durazzo et al. | |
| 8,116,217 B2 | 2/2012 | Uchida et al. | |

(Continued)

FOREIGN PATENT DOCUMENTS

WO     2009039034 A1     3/2009

OTHER PUBLICATIONS

Kant, Krishna, "Power Control of High Speed Network Interconnects in Data Centers," IEEE INFOCOM 2009, Apr. 19, 2009.

(Continued)

*Primary Examiner* — M Elamin

(74) *Attorney, Agent, or Firm* — Duane S. Kobayashi

(57) ABSTRACT

A system and method for adjusting an energy efficient Ethernet (EEE) control policy using measured power savings. An EEE-enabled device can be designed to report EEE event data. This reported EEE event data can be used to quantify the actual EEE benefits of the EEE-enabled device, debug the EEE-enabled device, and adjust the EEE control policy.

20 Claims, 5 Drawing Sheets

(56) References Cited

U.S. PATENT DOCUMENTS

| | | |
|---|---|---|
| 2008/0005405 A1 | 1/2008 | Innis et al. |
| 2009/0077394 A1* | 3/2009 | Tsai et al. .................. 713/310 |
| 2010/0005322 A1 | 1/2010 | Diab et al. |
| 2010/0115306 A1 | 5/2010 | Diab |
| 2010/0115316 A1 | 5/2010 | Diab |
| 2010/0229013 A1 | 9/2010 | Diab et al. |
| 2010/0312910 A1 | 12/2010 | Lin et al. |

OTHER PUBLICATIONS

Francisco Blanquicet et al., "Managing Energy Use in a Network with a New SNMP Power State MIB," $33^{rd}$ IEEE Conference on Local Computer Networks, Oct. 14-17, 2008.

European Search Report, Oct. 5, 2010.

Office Action, Taiwan Patent Office, Jan. 23, 2014.

* cited by examiner

SYSTEM AND METHOD FOR ADJUSTING AN ENERGY EFFICIENT ETHERNET CONTROL POLICY USING MEASURED POWER SAVINGS

This application is a continuation of non-provisional application Ser. No. 12/603,564, filed Oct. 21, 2009, now U.S. Pat. No. 8,347,121, which claims priority to provisional application No. 61/230,132, filed Jul. 31, 2009. Each of the above-identified applications is incorporated by reference herein, in its entirety, for all purposes.

BACKGROUND

1. Field of the Invention

The present invention relates generally to energy efficient Ethernet (EEE) and, more particularly, to a system and method for adjusting an EEE control policy using measured power savings.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks (IEEE 802.3az) has arisen to address the rising costs of IT equipment usage as a whole (i.e., PCs, displays, printers, servers, network equipment, etc.).

In designing an energy efficient solution, one of the considerations is the traffic profile on the network link. For example, many network links are typically in an idle state between sporadic bursts of data, while in other network links, there can be regular or intermittent low-bandwidth traffic, with bursts of high-bandwidth traffic. An additional consideration for an energy efficient solution is the extent to which the traffic is sensitive to buffering and latency. For example, some traffic patterns (e.g., HPC cluster or high-end 24-hr data center) are very sensitive to latency such that buffering would be problematic. For these and other reasons, applying energy efficient concepts to different traffic profiles would lead to different solutions. These varied solutions can therefore seek to adapt the link, link rate, and layers above the link to an optimal solution based on various energy costs and impact on traffic, which itself is dependent on the application. In providing an EEE solution that properly addresses the various competing considerations, what is needed is a mechanism that considers the real-world performance benefits in establishing the appropriate control policy objectives.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Energy Efficient Ethernet (EEE) networks attempt to save power when the traffic utilization of the network is not at its maximum capacity. This serves to minimize the performance impact while maximizing power savings. At a broad level, the EEE control policy for a particular link in the network determines when to enter a power saving state, what power saving state (i.e., level of power savings) to enter, how long to remain in that power saving state, what power saving state to transition to out of the previous power saving state, etc. Conventional EEE control policies can base these decisions on a combination of static settings established by an IT manager and the properties of the traffic on the link itself.

Figure 1:
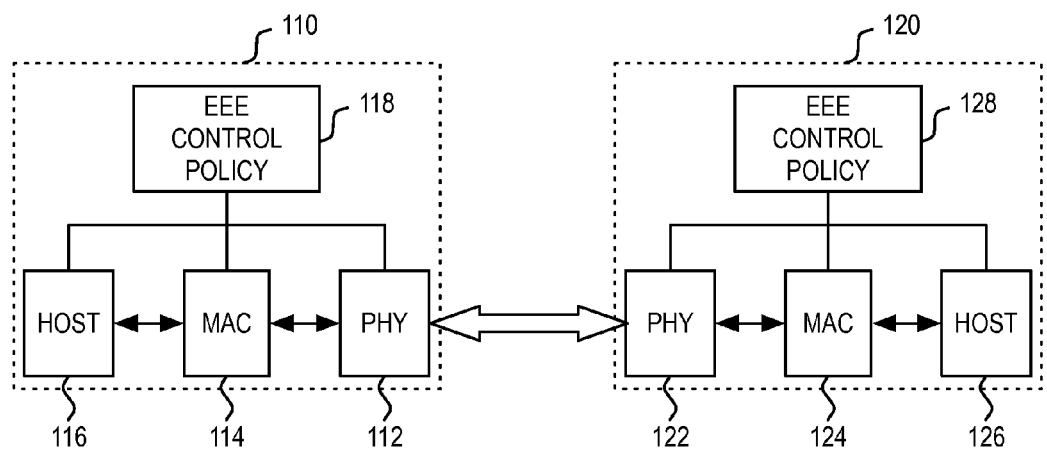
FIG. 1 illustrates an Ethernet link between link partners.

FIG. 1 illustrates an example link to which an EEE control policy can be applied. As illustrated, the link supports communication between a first link partner 110 and a second link partner 120. In various embodiments, link partners 110 and 120 can represent a switch, router, endpoint (e.g., server, client, VOIP phone, wireless access point, etc.), or the like. As would be appreciated, the link can operate at standard or non-standard (e.g., 2.5G, 5G, 10G, etc.) link rates, as well as future link rates (e.g., 40G, 100G, etc.). The link can also be supported by various port types (e.g., backplane, twisted pair, optical, etc.) and in various applications (e.g., Broadreach Ethernet, EPON, etc.).

As illustrated, link partner 110 includes physical layer device (PHY) 112, media access control (MAC) 114, and host 116, while link partner 120 includes PHY 122, MAC 124, and host 126.

In general, hosts 116 and 126 may comprise suitable logic, circuitry, and/or code that may enable operability and/or functionality of the five highest functional layers for data packets that are to be transmitted over the link. Since each layer in the OSI model provides a service to the immediately higher interfacing layer, MAC controllers 114 and 124 may provide the necessary services to hosts 116 and 126 to ensure that packets are suitably formatted and communicated to PHYs 112 and 122. MAC controllers 114 and 124 may comprise suitable logic, circuitry, and/or code that may enable handling of data link layer (Layer 2) operability and/or functionality. MAC controllers 114 and 124 can be configured to implement Ethernet protocols, such as those based on the IEEE 802.3 standard, for example. PHYs 112 and 122 can be configured to handle physical layer requirements, which include, but are not limited to, packetization, data transfer and serialization/deserialization (SERDES).

In general, controlling the data rate of the link may enable link partners 110 and 120 to communicate in a more energy efficient manner. More specifically, a reduction in link rate to a sub-rate of the main rate enables a reduction in power, thereby leading to power savings. In one example, this sub-rate can be a zero rate, which produces maximum power savings.

One example of subrating is through the use of a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate. For example, a subset 1G PHY can be created from a parent 10G PHY by a process that turns off three of the four channels. In another embodiment, the subset PHY technique is enabled by slowing down the clock rate of a parent PHY. For example, a parent PHY having an enhanced core that can be slowed down and sped up by a frequency multiple can be slowed down by a factor of 10 during low link utilization, then sped up by a factor of 10 when a burst of data is received. In this example of a factor of 10, a 10G enhanced core can be transitioned down to a 1G link rate when idle, and sped back up to a 10G link rate when data is to be transmitted.

Another example of subrating is through the use of a low power idle (LPI) technique. In general, LPI relies on entering a quiet state where power savings can be achieved when there is nothing to transmit. Power is thereby saved when the link is off. Refresh signals can be sent periodically to enable wake up from the sleep mode. In one embodiment, a sync signal can be used on the interfaces (i.e., medium dependent interface (MDI) and MAC/PHY interface) to allow for a quick wake up from the sleep mode and maintain frequency lock. For example, on the MDI interface for a 10GBASE-T signal, a simple PAM2 pseudorandom bit sequence could be used on pair A during LPI mode. This would not significantly increase the power that is consumed.

In general, both the subset and LPI techniques involve turning off or otherwise modifying portions of the PHY during a period of low link utilization. As in the PHY, power savings in the higher layers (e.g., MAC) can also be achieved by using various forms of subrating as well.

As FIG. 1 further illustrates, link partners 110 and 120 also include EEE control policy entities 118 and 128, respectively. In general, EEE control policy entities 118 and 128 can be designed to determine when to enter a power saving state, what power saving state (i.e., level of power savings) to enter, how long to remain in that power saving state, what power saving state to transition to out of the previous power saving state, etc.

EEE control policy entities 118 and 128 can comprise suitable logic, circuitry, and/or code that may be enabled to establish and/or implement an EEE control policy for the network in which the link resides. In various embodiments, EEE control policy entities 118 and 128 can be a logical and/or functional block which may, for example, be implemented in one or more layers, including portions of the PHY or enhanced PHY, MAC, switch, controller, or other subsystems in the host.

EEE control policy entities 118 and 128 can be enabled to analyze traffic on the physical link and to analyze operations and/or processing of data in link partners 110 and 120. In this manner, EEE control policy entities 118 and 128 may exchange information from, or pertaining to, one or more layers of the OSI hierarchy in order to establish and/or implement the EEE control policy.

As noted, conventional EEE control policies are designed to base their decisions on a combination of static settings established by an IT manager, default software configuration, properties of the traffic bandwidth on the link itself, time of day, or by some other set of fixed parameters. These considerations are limited. For example, the EEE control policy can be designed to examine empty or non-empty conditions of ports, queues, buffers, etc. to determine whether to transition to or from an power saving state. In this process, the true benefits or performance of the EEE control policy would not be known as the presumption of power savings would control.

It is a feature of the present invention that an effectiveness of an EEE control policy can be examined based on the tracking of power saving statistics. Moreover, these power saving statistics can be used to quantify the benefits of the EEE control policy relative to the bottom line, facilitate debugging of power saving devices, and improve the EEE control policy through the use of the power saving statistics as feedback.

Figure 2:
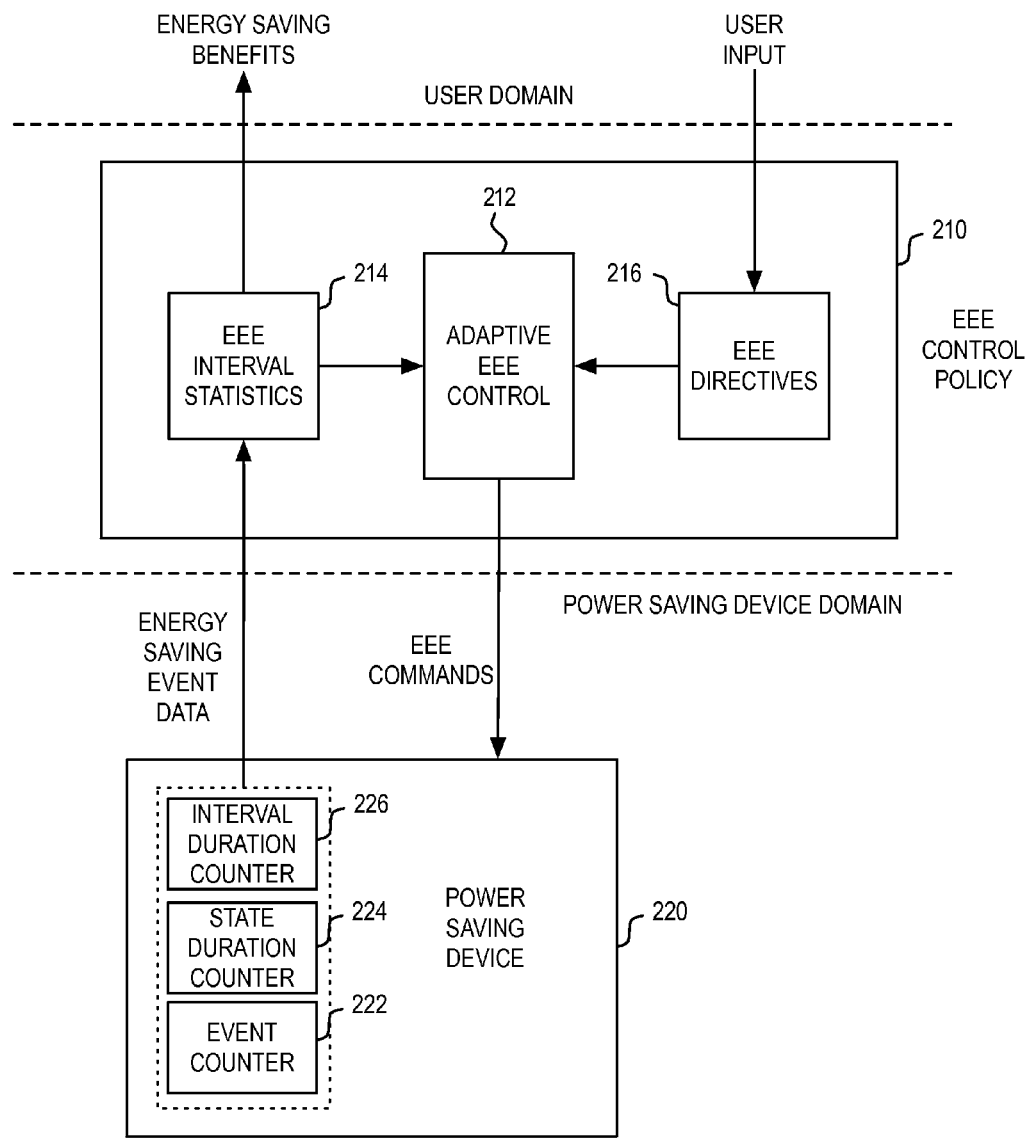
FIG. 2 illustrates an example of a control policy that is dynamically adjustable.

To illustrate these features of the present invention, reference is now made to FIG. 2, which illustrates an embodiment of an EEE control policy. As illustrated, EEE control policy 210 resides between a user domain and a power saving device domain. The power saving device domain can include any EEE or non-EEE enabled power saving device 220 that can save power through the use of one or more power saving states. In one example, power saving device 220 is a subset PHY. As would be appreciated, power saving device 220 can represent any component, system or subsystem.

Transition to and from the one or more power saving states supported by power saving device 220 can be effected through the generation of EEE commands by EEE control 212. As noted, EEE control 212 can be designed to analyze traffic-related data that are received from various system components (e.g., PHY, MAC, and host). In one example, EEE control 212 can be designed to analyze data received from a memory management unit, an egress pipeline, a port, and a MAC, which data can be used to assess whether all queues associated with an interface are empty and no packets are pending departure. Analysis of such data can yield a command for power saving device 220 to enter a power saving state (e.g., power saving PHY to enter a low power idle mode).

Conventionally, the generation of EEE commands by EEE control 212 would adhere to the pre-programmed control mechanism. This would be true regardless of whether those EEE commands were effective in meeting the organizations goals of power and performance.

In the present invention, power saving statistics are generated by power saving device 220 to identify the actual performance of the generated EEE commands. As illustrated in FIG. 2, power saving event data is generated by power saving device 220 and transmitted to EEE interval statistics module 214. Power saving event data can be captured for a plurality of events that occurred in a particular measurement interval. For example, power saving device 220 can be designed to report a length of a measurement interval, the number of power saving events within the measurement interval, and the amount of time power saving device 220 remained in the power saving state during the measurement interval.

In one embodiment, power saving device 220 includes event counter 222 that is incremented each time power saving device 220 transitions to the power saving state. Power saving device 220 can also include power saving state duration counter 224, which can be designed to measure the total duration of time that power saving device 220 was in the power saving state during the measurement interval.

In another embodiment, a counter can be provided for each state. These per-state counters can be designed to track the amount of time the power saving device remains in a given power saving (or even active) state.

Finally, the measurement interval can be measured by interval duration counter 226, which tracks the time elapsed since power saving device 220 was last polled. The values of event counter 222, power saving state duration counter 224, and interval duration counter 226 can be reported to EEE control policy 210 when polled. Counters 222, 224, and 226 would then be reset for the next measurement interval. As would be appreciated, the various counters 222, 224, and 226 can be embodied in hardware or software.

The provision of the power saving event data to EEE interval statistics module 214 provides an opportunity for EEE control policy 210 to quantify the actual EEE benefits in power saving device 220. In one embodiment, EEE interval statistics module 214 determines an actual amount of power saved, by multiplying the amount of time that power saving device 220 remained in the power saving state by the average power savings per unit time that is associated with the power saving state. As would be appreciated, an aggregate amount of power saved can also be produced through a calculation of the actual amount of power saved for each defined power saving state.

As illustrated in FIG. 2, EEE interval statistics module 214 can report power saving benefits information to the user domain to enable reporting of the power-saving performance of power saving device 220. In one example, the power saving benefits information can include the actual amount of power saved during the measurement interval along with the number of events occurring during the measurement interval.

In and of itself, the reported actual amount of power saved during the measurement interval provides a bottom-line determination of the power-saving effectiveness of power saving device 220. This power saving benefit information can be reported as the number of watts saved, average power savings per measured period, average power savings per event, average or percent of time spent in the power saving state, etc. In one example, the power savings can be further translated to an actual dollar amount using energy cost information that is associated with that measurement interval. Additionally, this power saving benefits information can be extrapolated over time to provide a long-term cost savings estimate for power saving device 220.

As a side benefit, the power saving event data can also be used to debug power saving device 220. Here, the reported power saving event data can be used to determine whether power saving device 220 is properly responding to traffic conditions. For example, the power saving event data can be used to confirm that power saving device 220 is properly entering and/or exiting the various power saving states.

In addition to using the power saving statistics to quantify the benefits of the EEE control policy relative to the bottom line and debugging the power saving device, the power saving statistics can also be used to improve the EEE control policy. As illustrated in FIG. 2, EEE interval statistics module 214 can be designed to provide input to adaptive EEE control 212. In general, adaptive EEE control 212 is designed to allow improvement to the implemented EEE control policy based on the power saving event data retrieved from the power saving device.

In one embodiment, the power saving event data or statistics based on the power saving event data is provided directly as input to adaptive EEE control 212. In this manner, adaptive EEE control 212 can be designed to automatically incorporate the provided input as feedback into an adaptive EEE control policy. For example, if the determined average amount of time spent per event in an power saving state drops below a threshold value, then adaptive EEE control 212 may infer that the power saving states are being inefficiently used. Adaptive EEE control 212 could then choose to increase a timer value that serves to delay entry into the power saving state. In another example, if adaptive EEE control 212 determines that the average power saved during a first time period (e.g., 9 PM to 4 AM) is greater than the average power saved during a second time period (e.g., 10 AM to 3 PM), then adaptive EEE control 212 can infer that the first time period has reflects a lower link utilization. Adaptive EEE control 212 could then choose to relax, for the first time period, thresholds that determine whether to enter the power saving state.

In another embodiment, the power saving event data or statistics based on the power saving event data is used indirectly by adaptive EEE control 212. As illustrated in FIG. 2, the EEE interval statistics module 214 provide power saving benefits information to the user domain. This reported power saving benefits information can be used by a user to "tune" the EEE control policy.

In general, the enabling of an EEE feature in a device can result in some amount of degradation in the performance of the system due to delays in transitioning the power saving device from an power saving state to an active state. This degradation in performance represents a tradeoff relative to the amount of power saved. By providing power saving metrics to the user, the user can then determine whether the power savings attained from reduced power consumption by the power saving device is sufficient compensation for the corresponding degradation in performance. In the absence of the power saving metrics, it would be very difficult for the user to perform a meaningful comparison of the performance/power savings tradeoff This is especially true when dealing with dynamic systems whose performance characteristics can change over time.

In one embodiment, the power saving metrics can be used by the user in identifying a general set of guidelines for the EEE control policy. For example, the user can be presented with three different policy objectives (e.g., maximum power savings, maximum performance, and balanced) that would each have different preset thresholds, timers, etc. Based on the power saving metrics, the user can select a particular policy objective and provide an indication of such a selection as user input into EEE directives module 216. In turn, EEE directives module 216 can translate the user input into control data that can adjust the control policy settings implemented by adaptive EEE control 212.

Figure 3:
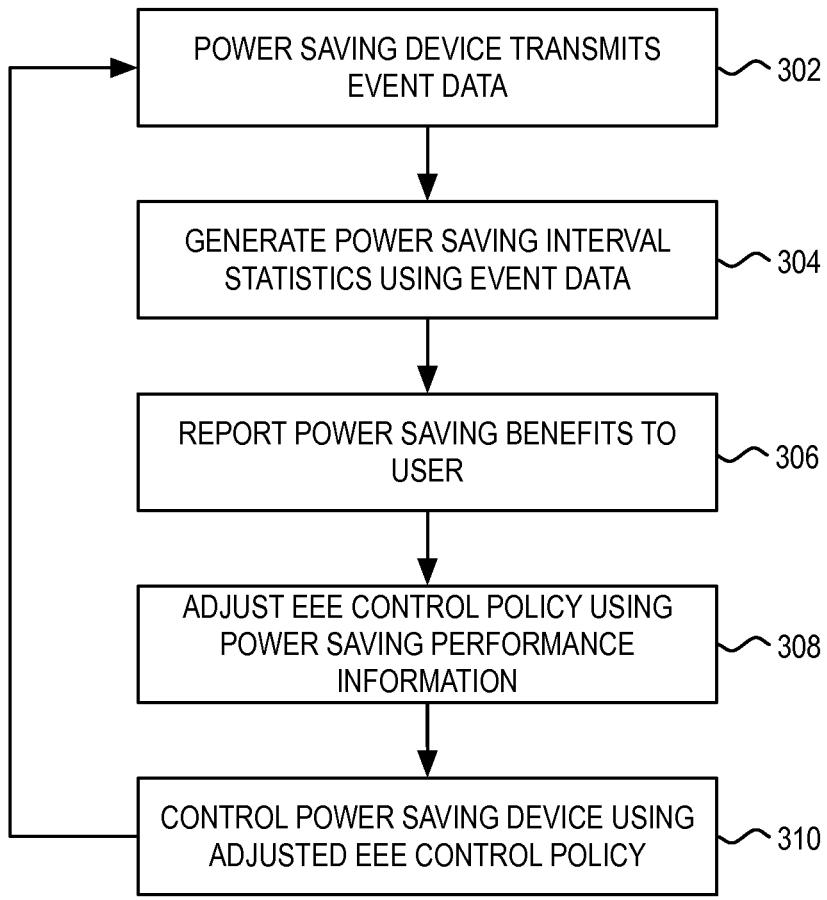
FIG. 3 illustrates a flowchart of a process of dynamically adjusting a control policy.

To further illustrate these features of the present invention, reference is now made to the flowchart of FIG. 3. As illustrated, the process begins at step 302 where a power saving device transmits power saving event data. As noted, the power saving event data can include data such as a measurement interval duration, a number of events within the measurement interval, and a duration of time during the measurement interval where the power saving device was in a power saving state. In one example, the power saving event data can include an actual power saving measurement.

In one example, the power saving event data is transmitted in response to a poll. In another example, the power saving event data is transmitted at the initiative of the power saving device.

At step 304, power saving interval statistics are generated using the power saving event data. Examples of such power saving interval statistics include the actual amount of power saved during the measurement interval along with the number of events occurring during the measurement interval. As would be appreciated, the power saving interval statistics can be computed in the EEE control policy or in the user domain.

Next, at step 306, power saving benefits based on the power saving interval statistics are reported to the user. Examples of such power saving benefits include the number of watts saved, average power savings per measured period, dollar value of power savings, etc. As would be appreciated, other types of power saving benefits can be reported to the user. In one example, both the power saving interval statistics and the power saving benefits are provided to the user. Here, the general intent is that the user is provided with actual power saving performance information that enables an understanding of the relative value of the power saving feature in the device.

In the present invention, the creation of power saving performance information is not solely for informational purposes. Rather, the power saving performance information is also used to adjust the EEE control policy at step 308. As such, the EEE control policy is adaptive based on some measure of the power savings relative to the performance impact of the power saving feature in the device. In one embodiment, the EEE control policy is adapted (e.g., changes in thresholds, timers, power saving state parameter, change in power saving state to be entered, etc.) directly using the raw power saving event data or power saving performance information derived from the raw power saving event data. In another embodiment, the EEE control policy is adapted indirectly through a user's analysis of the power saving performance information and the subsequent EEE directives produced from such an analysis. In other embodiments, the EEE control policy is adapted using EEE power saving information in combination with other standardized or non-standardized metrics such as operations, administration and maintenance (OAM) information, loss rate, packet drops, state of TX and RX interfaces (e.g., LP IDLE codewords), etc. Regardless of the particular adaptive mechanism used, the adapted EEE control policy can then control the power saving device at step 310.

As illustrated in the flowchart of FIG. 3, the process then loops back to step 302 where additional event data is transmitted by the power saving device. This process illustrates the continual adaptive nature of the process of the present invention in responding to sub-optimal operating conditions that occur over time. This is in marked contrast to static, predefined EEE control policies, which represent a best guess or approximation to behavior in a particular scenario.

In one embodiment, the principles of the present invention are also applicable to cascaded interfaces or any general interface in which the ultimate endpoints have intermediaries that can also enter a low power state. In this context, an accurate picture of the power savings can be obtained by incorporating the principles of the present invention at each intermediate stage.

Figure 4:
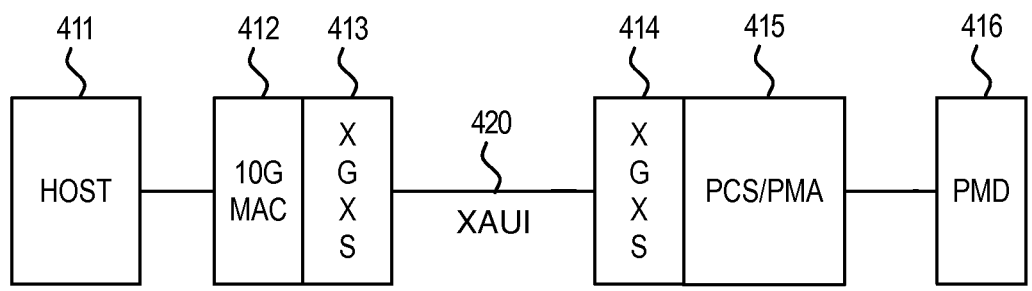
FIG. 4 illustrates an example of a cascaded interface.

FIG. 4 illustrates an example of a cascaded interface. As illustrated, host 411 communicates with 10G MAC 412. Here, 10G MAC 412 communicates with PCS/PMA module 415 via 10 Gigabit eXtended Attachment Unit Interface (XAUI) interface 420. In general, XAUI is a standard for extending the XGMII interface between the MAC and PHY layer of 10G Ethernet, and is supported by XGMII eXtender Sublayer (XGXS) devices 413, 414.

When PCS/PMA 415 and PMD 416 enter into a power saving state, XGXS devices 413 and 414 can also enter into a power saving state. The actual power saving state for the cascaded interface is therefore the combined result of the power saved in XGXS 413, XGXS 414, as well as PCS/PMA 415 and PMD 416. In the present invention, it is recognized that the true benefit of the PHY entering into a power saving state would be underestimated if each element of the cascaded interface is not represented in the EEE benefits calculation.

Figure 5:
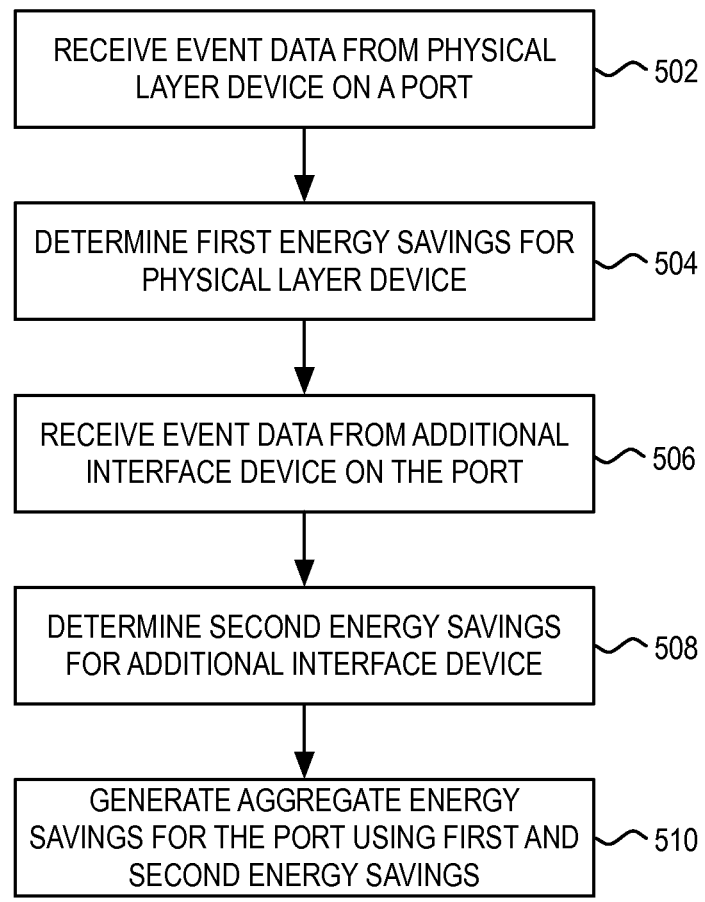
FIG. 5 illustrates a flowchart of a process of tracking energy savings on a cascaded interface.

In the present invention, the aggregate power savings is reported for a cascaded interface. FIG. 5 illustrates a flowchart of a process that can be applied to the example cascaded interface of FIG. 4. As illustrated, the process begins at step 502 where event data is received from a physical layer device (e.g. PCS/PMA) on a port. First power savings for the physical layer device is then determined at step 504. At step 506, event data is also received from an additional interface device (e.g., XGXS) on that port. Second power savings for the additional interface device is then determined at step 508. Finally, at step 510, an aggregate power savings for the port is generated using the first and second power savings. As would be appreciated, the adaptive EEE control policy of the present invention provides an ability to tune the power savings profile of each of the intermediate stages in the cascaded interface in a coordinated fashion.

As would be appreciated, the principles of the present invention as applied to a cascaded interface is not limited to the example of FIGS. 4 and 5. Rather, the principles of the present invention can be applied to a general cascaded interface that includes any number of components, modules, subsystems, systems, etc., whose power savings behavior is related. In this manner, the generation of an aggregate power savings of multiple such power saving devices provides a more accurate picture of the true power saving benefit to which a performance measure can be compared.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An energy efficient device, comprising:
   one or more circuits for use in the energy efficient device, said one or more circuits being configured to:
   receive, from a power saving device via an electronic communication, information relating to a power saving event in said power saving device;
   determine, based on said received information, one or more aggregate power saving statistics from a plurality of power saving events occurring in a measurement interval; and
   adjust, based on said determined one or more aggregate power saving statistics, a control policy that determines when said power saving device should enter or exit a power saving state.

2. The device of claim 1, wherein said one or more circuits are configured to receive information from a physical layer device.

3. The device of claim 1, wherein said one or more circuits are configured to receive information from a media access control device.

4. The device of claim 1, wherein said one or more circuits are configured to receive information from a subsystem of said device.

5. The device of claim 1, wherein said one or more circuits are configured to determine a total power savings generated by said plurality of power saving events in said measurement interval.

6. The device of claim 1, wherein said one or more circuits are configured to determine an average power savings per power saving event for said plurality of power saving events in said measurement interval.

7. The device of claim 1, wherein said one or more circuits are configured to adjust one or more of a timer for said control policy, a threshold for said control policy, a power saving parameter, and a power saving state to be entered.

8. An energy efficient device, comprising:
a power saving module having circuitry that supports a first and a second state of operation, wherein said first state of operation is an active state that enables communication with a link partner at a first link transmission rate and said second state of operation is a power saving state that enables communication with a link partner at a second link transmission rate lower than said first link transmission rate;
a first counter that tracks a number of times said power saving module enters into said power saving state during a measurement interval;
a second counter that tracks an amount of time said power saving module is in said power saving state during said measurement interval; and
a statistics module that receives results from said first counter and said second counter, said received results enabling said statistics module to track a power saving performance of said power saving module during said measurement interval.

9. The device of claim 8, wherein said power saving module is a physical layer device.

10. The device of claim 8, wherein said power saving module is a media access control device.

11. The device of claim 8, wherein said power saving module is a subsystem of said device.

12. The device of claim 8, wherein said power saving state is a low power idle state.

13. The device of claim 8, wherein said power saving state is a subset physical layer device state.

14. The device of claim 8, wherein said statistics module is configured to determine a total power savings generated by a plurality or power saving events in said measurement interval.

15. The device of claim 8, wherein said statistics module is configured to determine an average power savings per power saving event for a plurality of power saving events in said measurement interval.

16. The device of claim 8, further comprising an energy efficiency control policy, said energy efficiency control policy being adjusted based on information received from said statistics module.

17. The device of claim 16, wherein a timer for said energy efficiency control policy is adjusted.

18. The device of claim 16, wherein a threshold for said energy efficiency control policy is adjusted.

19. The device of claim 16, wherein a power saving parameter for said energy efficiency control policy is adjusted.

20. The device of claim 16, wherein a power saving state for said energy efficiency control policy is adjusted.

* * * * *